United States Patent
Lumsden et al.

(10) Patent No.: US 8,662,171 B2
(45) Date of Patent: Mar. 4, 2014

(54) METHOD AND COMPOSITION FOR OIL ENHANCED RECOVERY

(75) Inventors: Charles A. Lumsden, Greensboro, GA (US); Raul O. Diaz, Spring, TX (US)

(73) Assignees: Montgomery Chemicals, LLC, Conshohocken, PA (US); Nalco Company, Naperville, IL (US)

( * ) Notice: Subject to any disclaimer, the term of this patent is extended or adjusted under 35 U.S.C. 154(b) by 274 days.

(21) Appl. No.: 13/048,131

(22) Filed: Mar. 15, 2011

(65) Prior Publication Data
US 2011/0232904 A1 Sep. 29, 2011

Related U.S. Application Data

(60) Provisional application No. 61/317,536, filed on Mar. 25, 2010.

(51) Int. Cl.
*E21B 43/20* (2006.01)
*E21B 43/25* (2006.01)
*C09K 8/68* (2006.01)

(52) U.S. Cl.
USPC ............... 166/270.1; 166/400; 166/305.1; 507/203; 507/210; 507/211

(58) Field of Classification Search
None
See application file for complete search history.

(56) References Cited

U.S. PATENT DOCUMENTS

| | | | | |
|---|---|---|---|---|
| 3,167,515 A | * | 1/1965 | Hinckley et al. | 252/188.22 |
| 3,290,161 A | * | 12/1966 | Kibbel, Jr. et al. | 501/147 |
| 3,343,601 A | * | 9/1967 | Pye | 166/306 |
| 3,580,337 A | * | 5/1971 | Gogarty et al. | 166/270.1 |
| 4,059,533 A | * | 11/1977 | Watson et al. | 507/113 |
| 4,098,337 A | * | 7/1978 | Argabright et al. | 166/270 |
| 4,218,327 A | * | 8/1980 | Wellington | 507/213 |
| 4,232,739 A | * | 11/1980 | Franklin | 166/275 |
| 4,234,433 A | * | 11/1980 | Rhudy et al. | 507/225 |
| 4,376,850 A | * | 3/1983 | Sanner | 526/196 |
| 4,389,319 A | * | 6/1983 | Block et al. | 507/114 |
| 4,395,340 A | * | 7/1983 | McLaughlin | 507/226 |
| 4,401,789 A | * | 8/1983 | Gideon | 524/827 |
| 4,439,334 A | * | 3/1984 | Borchardt | 507/224 |
| 4,458,753 A | | 7/1984 | Philips et al. | |
| 4,534,954 A | * | 8/1985 | Little et al. | 423/515 |
| 4,541,485 A | * | 9/1985 | Block | 166/281 |
| 4,687,586 A | * | 8/1987 | Argabright et al. | 507/225 |
| 4,714,113 A | * | 12/1987 | Mohnot et al. | 166/270 |

(Continued)

FOREIGN PATENT DOCUMENTS

| | | | | |
|---|---|---|---|---|
| CA | 1279315 C | | 1/1991 | |
| EP | 196199 A2 | * | 10/1986 | E21B 43/25 |

OTHER PUBLICATIONS

International Search Report and Written Opinion issued Dec. 20, 2011 in corresponding International Application No. PCT/US2011/029709 (7 pages).

*Primary Examiner* — Angela M DiTrani
*Assistant Examiner* — Anuradha Ahuja
(74) *Attorney, Agent, or Firm* — Edward O. Yonter

(57) ABSTRACT

A process for enhanced oil recovery includes the steps of providing an alkali metal borohydride; providing an alkali metal bisulfite; combining the alkali metal borohydride and the alkali metal bisulfite along with water to provide an oxygen-scavenger composition; combining the oxygen-scavenger composition and an aqueous composition to provide an oil recovery solution; and introducing the oil recovery solution into an earthen formation at a pressure to provide for enhanced oil recovery.

19 Claims, 1 Drawing Sheet

(56) References Cited

U.S. PATENT DOCUMENTS

| | | | |
|---|---|---|---|
| 4,795,575 A * | 1/1989 | Southwick et al. | 507/225 |
| 4,834,182 A | 5/1989 | Shu | |
| 4,836,282 A | 6/1989 | Hsieh | |
| 4,898,819 A | 2/1990 | Linossier | |
| 4,919,755 A * | 4/1990 | Mansson | 162/83 |
| 4,980,393 A | 12/1990 | Shu | |
| 5,076,363 A | 12/1991 | Kalpakci et al. | |
| 5,129,457 A | 7/1992 | Sydansk | |
| 5,284,206 A | 2/1994 | Surles et al. | |
| 5,382,371 A | 1/1995 | Stahl et al. | |
| 5,487,425 A | 1/1996 | Ohno et al. | |
| 5,650,633 A | 7/1997 | Ahmed et al. | |
| 5,693,698 A | 12/1997 | Patel et al. | |
| 5,708,107 A | 1/1998 | Ahmed et al. | |
| 6,030,928 A | 2/2000 | Stahl et al. | |
| 6,051,670 A | 4/2000 | Ahmed et al. | |
| 6,828,281 B1 | 12/2004 | Hou et al. | |
| 7,091,160 B2 | 8/2006 | Dao et al. | |
| 7,262,153 B2 | 8/2007 | Shpakoff et al. | |
| 7,300,973 B2 | 11/2007 | Chang et al. | |
| 7,612,022 B2 | 11/2009 | Shpakoff et al. | |
| 7,622,428 B2 | 11/2009 | Huff et al. | |
| 2006/0058199 A1 * | 3/2006 | Berger et al. | 507/259 |
| 2007/0125714 A1 | 6/2007 | Reddy | |

\* cited by examiner

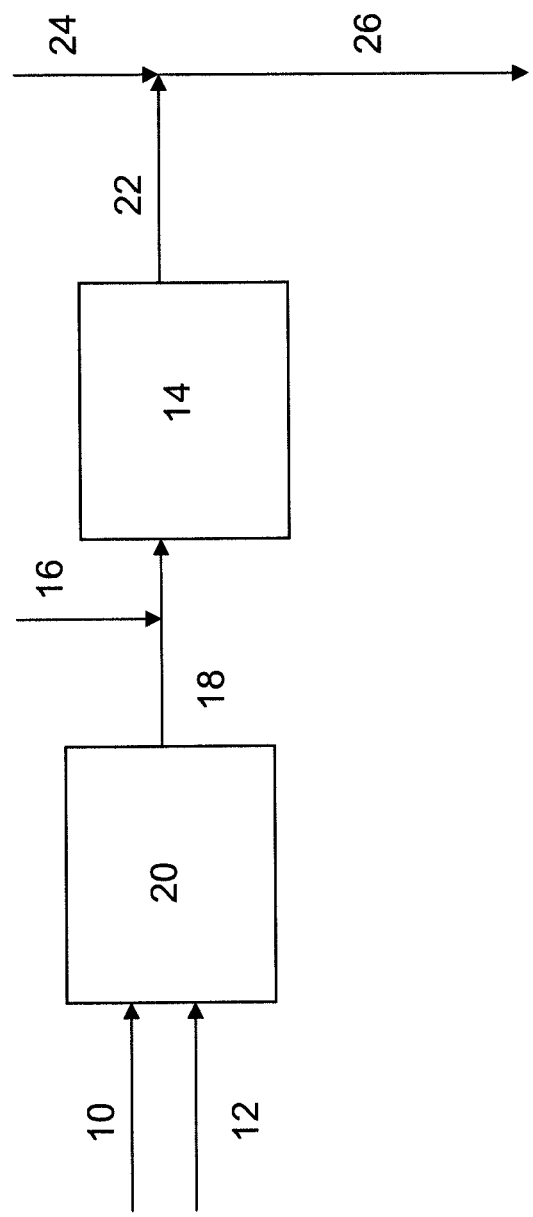

METHOD AND COMPOSITION FOR OIL ENHANCED RECOVERY

CROSS-REFERENCE TO RELATED APPLICATIONS

This application claims priority from U.S. Patent Application No. 61/317,536, filed on Mar. 25, 2010. Furthermore, this application incorporates by reference herein the subject matter of U.S. Patent Application No. 61/317,536.

FIELD OF THE INVENTION

Embodiments disclosed herein relate generally to a process for preparing polymer surfactant compositions for use in petroleum recovery, to the compositions employed, and to methods for employing such compositions in petroleum recovery.

BACKGROUND OF INVENTION

Petroleum recovery is typically accomplished by drilling into a petroleum containing formation and utilizing one of the well known methods for the production of petroleum. However, these recovery techniques may recover only a minor portion of the petroleum present in the formation particularly when applied to formations containing viscous petroleum. In such cases, secondary recovery methods, such as water flooding, steam injection, gas flooding and combinations thereof, may be used to enhance petroleum recovery. Underground oil-containing formations also contain clay or clay like bodies and treatment with water or steam generally results in swelling of the clay by absorption of the water, with the result that the water permeability of a formation is decreased. The decrease in the permeability of the formation causes a reduction in the amount of oil which may be recovered by secondary recovery operations.

Methods for enhancing the recovery of petroleum from underground formations are known. The production of petroleum may be improved or reinstated from formations which have been partially depleted by primary recovery techniques or where communication between an injection well and a recovery well has been restricted by the swelling of water sensitive clays in the formation. Methods include injecting an aqueous composition into a first well to force residual petroleum in an underground formation through the formation and out of one or more recovery wells. A water dispersible polymeric material such as a hydrated polysaccharide may be included in the aqueous composition to increase viscosity when the residual petroleum is viscous.

The injected aqueous compositions generally have a lower viscosity at reservoir conditions than the viscosity of the formation crude which it is intended to displace, making it less effective. Various additives, such as polymers, have been proposed to increase the viscosity of the injected fluid in order to improve the efficiency.

These aqueous compositions often contain dissolved or entrained air which increases the rate of corrosion and deterioration of metal surfaces in the drill string and associated equipment. Oxygen scavenger additives such as sodium dithionite and mixtures thereof have been used with some success. Sodium dithionite is available in powder or liquid form but is difficult to handle and presents a fire hazard when exposed to the atmosphere. When used in powder form, the sodium dithionite is typically suspended in a liquid carrier, insulating the oxygen reactive materials from the atmosphere. When used in liquid form, the sodium dithionite must be transported under climate control.

U.S. Pat. No. 4,458,753 discloses a method of tertiary oil recovery from petroleum formations at elevated temperature by injecting a substantially oxygen-free aqueous saline solution of a water-soluble polysaccharide biopolymer treated at pH of at least 5 by addition of alkali metal borohydride as a viscosity stabilizer.

U.S. Pat. No. 4,218,327 discloses the use of oxygen scavengers and alcohols to stabilize water-soluble anionic polysaccharide (Xanthan gum polymer) solutions from loss of viscosity at elevated temperatures.

Accordingly, there exists a need to provide a stable sodium dithionite composition for use in industrial applications while minimizing the impact to the environment and eliminating operator's exposure.

SUMMARY OF INVENTION

In one aspect, embodiments disclosed herein relate to a process for enhanced oil recovery. The process includes the steps of providing an alkali metal borohydride; providing an alkali metal bisulfite; combining the alkali metal borohydride and the alkali metal bisulfite along with water to provide an oxygen-scavenger composition; combining the oxygen-scavenger composition and an aqueous composition to provide an oil recovery solution; and introducing the oil recovery solution into an earthen formation at a pressure to provide for enhanced oil recovery.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF DRAWINGS

FIG. 1 is a process flow diagram of a process in accordance with embodiments disclosed herein.

DETAILED DESCRIPTION

Embodiments disclosed herein relate to the use of aqueous compositions in oil recovery applications. Other embodiments of the disclosure relate to methods for producing aqueous compositions for oil recovery. In the following description, numerous details are set forth to provide an understanding of the present disclosure. However, it will be understood by those skilled in the art that the present invention may be practiced without these details and that numerous variations or modifications from the described embodiments may be possible.

In one aspect, embodiments disclosed herein relate to a process for enhancing recovery of oil in an earthen formation. The process may include: introducing an aqueous composition into the earthen formation where an oxygen-scavenger additive composition has been added to the aqueous composition. In other aspects, embodiments disclosed herein relate to methods of making such oxygen-scavenger additive compositions, and applications in which the oxygen-scavenger additive compositions disclosed herein may be useful.

In particular embodiments disclosed herein relate to the use of alkali metal dithionites as an oxygen scavenger in oilfield applications. As discussed above, sodium dithionite is difficult to handle and transport. In accordance with embodiments of the present disclosure, sodium dithionite (or other alkali metal dithionites) is prepared on the fly at the wellsite for use in wellbore operations. The oxygen scavenger (dithionites) dose/rate may be tailored to conditions in the field. Specifically, in accordance with embodiments of the present disclosure, an alkali metal borohydride may be reacted with an alkali metal bisulfite to yield an alkali metal dithionite, which may be introduced into an aqueous composition being injected into a wellbore.

Referring to FIG. 1, a process for providing an oxygen-scavenger additive composition 18 preferably includes mixing a stream of an alkali metal borohydride 10 with a stream of an alkali metal bisulfite 12. In a preferred embodiment, the mixing occurs via an in-line mixer 20 upstream of a tank 14. The tank 14 may be a mixing/storage vessel.

In a preferred embodiment, the oxygen-scavenger additive composition 18 is added to a stream of water 16 upstream of the tank 14. In an alternate embodiment, the oxygen-scavenger additive composition 18 and the water 16 are mixed in the tank 14, without using mixer 20. The oxygen-scavenger additive composition 18 is added to water 16 to control iron and dissolved oxygen in the water 16 prior to being used in a wellbore operation. The oxygen-scavenger additive 18 may also be used to reduce iron and to adjust the pH of the product stream 22. The pH of the product stream 22 may range from about 6 to about 8, more preferably about 6.8.

A product stream 22 from the tank 14 may be used in a variety of oilfield processes which require the stream of water 16 to be substantially oxygen-free. These processes may include, but are not limited to, oil recovery operations and enhanced oil recovery operations, whereby an aqueous solution is injected through an injection well to push hydrocarbons through the formation to be recovered at a production well. The properties of the oxygen-scavenger additive composition 18 may be adjusted based on the conditions of the water 16 or the required properties of the product stream 22. For example, the relative amounts of alkali metal borohydride 10 and alkali metal bisulfite 12 may be varied or the dilution of the product formed may be varied on the fly, depending on the needs of the downstream process.

The amount of alkali metal borohydride 10 may range from about 1 to about 40 ppm, and in a preferred embodiment, the alkali metal borohydride 10 may range from about 5 to about 20 ppm. The amount of alkali metal bisulfite 12 may range from about 6 to about 320 ppm, and in a preferred embodiment, the alkali metal bisulfite 12 may range from about 30 to about 200 ppm. The amount of alkali metal borohydride 10 and alkali metal bisulfite 12 may be adjusted based upon the pH and hardness of the water.

The alkali metal borohydride 10 may be any alkali metal borohydride or substituted borohydride such as sodium cyanoboride. In a preferred embodiment, the alkali metal borohydride 10 is sodium borohydride.

The alkali metal bisulfite 12 may be any water-soluble oxygen scavengers that contain or form ions that contain an $SO_3$-group. In a preferred embodiment, the alkali metal bisulfite 12 is sodium bisulfite. In alternate embodiments, the alkali metal bisulfite 12 may be an alkali metal bisulfite, sulfinic acid precursors, such as, but not limited to alkali metal sulfites or alkali metal dithionites, etc. In still other embodiments, the alkali metal bisulfite 12 may be ammonium bisulfite and other sulfite salts that contain an $SO_3$-group.

In a preferred embodiment, sodium borohydride reacts with sodium bisulfite to give sodium dithionite, which in turn yields sulfinic acid, and ultimately hydrogen as the oxygen scavenger:

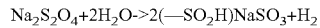

At an eight-to-one mole ratio, more sulfinic acid is formed than hydrosulfite in the reaction with some borohydride remaining unreacted that prevents the reformation of dissolved oxygen and also keeps the iron in its ferrous state.

The oxygen-scavenger additive composition 18 is preferably used in a slight stoichiometric excess, relative to the amount needed to remove substantially all of the dissolved oxygen in the stream of water 16 being treated. Such an excess is preferably from about 10 to 500% more than stoichiometric, more preferably double stoichiometric.

In alternative embodiments, the oxygen-scavenger additive composition 18 may include reducing agents such as sodium dithionite, thiourea dioxide, hydrazine, iron reduction additives, and chelating agents such as ethylenediaminetetraacetic acid (EDTA), diethylenetriamine pentaacetic acid (DTPA), or sodium tripolyphosphate (STPP).

In a preferred embodiment, such as for use in enhanced oil recovery processes, the product stream 22 may be added to an aqueous composition 24 which requires substantially oxygen free water. The aqueous composition 24 may include a suitable polymeric material, such as a water soluble anionic organic polymer, water, and one or more optional surfactants. The resulting polymer solution 26 is then used in conventional processes for tertiary oil recovery. The final concentration of the oxygen-scavenger additive composition 18 in the product stream 22 to be injected may be adjusted on site to provide an excess of about 50 to about 100 ppm of sodium hydrosulfite equivalent after scavenging all the oxygen.

The polymer employed may be an anionic synthetic polymer, such as a polyacrylate. Examples of polysaccharides that may be employed include hydroxyethyl cellulose, carboxymethylhydroxyethyl cellulose, and carboxymethyl cellulose. Examples of synthetic polymers that may be employed include polyacrylamides, and copolymers of ethylenically unsaturated carboxylic acids such as acrylic acid and methacrylic acid and neutral hydrophilic ethylenically unsaturated monomers such as hydroxyethyl acrylate, acrylamide, methacrylamide, allyl alcohol, vinyl acetate, vinyl propionate, and the like. In some embodiments, the polymer may be, but not limited to, guar and cellulose derivatives, xantham gum, partially hydrolyzed polyacrylamide, polyacrylates, ethylenic copolymers, biopolymers, polyvinyl alcohol, polystyrene sulfonates, polyvinylpyrrolidone, AMPS (2-acrylamide-2-methyl propane sulfonate) or combinations thereof. Examples of ethylenic copolymers include copolymers of acrylic acid and acrylamide, acrylic acid and lauryl acrylate, lauryl acrylate and acrylamide. Other suitable polymers and combinations of polymers may also be used.

Polymers that may be employed in the present disclosure are disclosed in U.S. Pat. Nos. 4,834,182, 4,836,282, 4,980, 393, 5,076,363, 5,129,457, 5,284,206, 5,382,371, 5,487,425, 5,650,633, 5,693,698, 5,708,107, 6,030,928, 6,051,670, 7,091,160, 7,300,973, and 7,622,428, and in U.S. Patent Application Publications Nos. 200510288190 A1, 200810190814 A1, 200810194435 A1, 200810318812 A1, 200910107681 A1, 200910111716 A1, 200910188669 A1, 200910260819 A1, 200910260820 A1, 200910264324 A1, 200910264325 A1, 200910281 003 A1, 201010022419 A1, each incorporated herein by reference.

In some embodiments, the surfactant may be alcohol-based. The surfactant may be an aliphatic anionic surfactant. The aliphatic anionic surfactant may be a long chain acid salt. In general, a long chain acid salt may be prepared from a long chain alcohol by generally known methods or purchased commercially. In alternate embodiments, the surfactant may be a blend of at least one synthetic polyisobutylene sulfonate, a sulfonate, an alcohol, a nonionic surfactant, or some combination thereof. In some embodiments, the surfactant may be an alpha-olefin sulfonate, an olefin sulfonate, an alkyl-aryl sulfonate, an alkyl-ether sulfonate. Examples of surfactants that may be employed include sodium 1-octane sulfonate, alkyl naphthalene sulfonate, linear alkyl aryl sulfonate, mixed synthetic sulfonate, sodium $C_{14-16}$ olefin sulfonate, sodium alkyl aryl sulfonate, and the like. Other suitable surfactants and combinations surfactants may also be used.

Surfactants that may be employed in the present disclosure are disclosed in U.S. Pat. Nos. 6,828,281, 7,262,153, 7,612,022, each incorporated herein by reference.

In a preferred oil recovery operation embodiment, an amount of the product stream 22 may be combined with the aqueous composition 24, such as an oil recovery fluid. The combining may be done by batch mixing in the mud pit or by injecting the additive upstream or downstream of the mud pumps. A dissolved oxygen meter may be utilized to monitor the dissolved oxygen content of the oil recovery fluid entering the drill string and flowing therethrough into the well bore so that if oxygen is entrained and dissolved in the well fluid in surface equipment, mud pits, etc., the oxygen meter indicates such fact. The product stream 22 of embodiments of the present disclosure may be continuously added to the well fluid at a rate sufficient to react with and remove the dissolved and entrained oxygen contained therein. As will be understood, the product stream 22 may be added to the well fluid in any convenient manner including periodically batch mixing a quantity of the additive with the well fluid in the mud pits. The amount of water 16 may also be adjusted based upon the requirements of the polymer solution 26 and the aqueous composition 24.

The oxygen-scavenger additive compositions 18 of the present invention are useful in a variety of applications other than for scavenging oxygen from well drilling fluids. For example, polymer type fluids are presently utilized in secondary and tertiary oil and gas recovery operations as well as in other oil, gas and water well completion and production techniques. Examples of such secondary applications include, but are not limited to, injecting seawater into a formation, treatment of produced and fresh water that sometimes is also used to maintain formation pressure, treatment of produced water that is being disposed into disposal wells to ensure that the integrity of the wells due to oxygen corrosion is not compromised and treatment of fresh water that is being used to dilute bauxite that is being transported in a suspension from a mine to the refinery with the sole objective of preventing corrosion due to oxygen. Moreover, the oxygen-scavenger additive composition 18 of the present disclosure have a universal application for scavenging oxygen from liquids and thereby preventing corrosion and chemical deterioration of surfaces contacted by the liquids. The oxygen-scavenger additive composition 18 are effective for the removal of oxygen at small concentrations and do not require catalysts or other ingredients for accelerating the oxygen reaction.

EXAMPLES

To a gallon of water, one milliliter of MontBrite 1240® (a trademark of Montgomery Chemical, Conshohocken, Pa.) and eight milliliters of 38 percent by weight aqueous sodium bisulfite was added. The pH of the resulting solution was about 7.0. The pH of the sulfonic acid as it is oxidized to sodium bisulfite is slightly acidic. MontBrite 1240 is a stable aqueous solution of sodium borohydride (12 percent) and sodium hydroxide (40 percent) available from Montgomery Chemical (Conshohocken, Pa.). A suitable water dispersible polymer and surfactant may then added to the treated water for use in tertiary oil recovery.

Although the use of powdered hydrosulfite is known for similar applications, it has been found that the pyrophoric nature and inherent instability of this material are disadvantageous.

The final concentration of the oxygen scavenger in the fluids to be injected may be adjusted on site to provide an excess of 50-100 ppm of sodium hydrosulfite equivalent after scavenging all the oxygen.

Advantages of the current disclosure may include an oxygen-scavenger additive composition which may be varied on site according to the aqueous composition to which it is being added. The process of providing oxygen-scavenger additive compositions 18 of the present disclosure is safer and more environmentally friendly than those used in the past. As such, the oxygen-scavenger additive composition may be adjusted to tailor the properties of the resultant polymer solution. Adjustable pH, amount of oxygen-scavenger additive and physical properties of the resulting polymer solution may be selected for a particular desired application. For example, the polymer solution may be chosen to an appropriate pH.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A process for oil recovery, the process comprising:
providing a stable aqueous solution comprising 12 percent sodium borohydride and 40 percent sodium hydroxide;
providing an alkali metal bisulfite;
combining the stable aqueous solution and the alkali metal bisulfite along with water to provide an oxygen-scavenger composition;
combining the oxygen-scavenger composition and an aqueous composition comprising a water soluble polymer to provide an oil recovery solution;
introducing the oil recovery solution into an earthen formation at a pressure to provide for oil recovery.

2. The process of claim 1, wherein the water soluble polymer is selected from the group consisting of polyacrylates, polysaccharides, polyacrylamides and co-polymers of ethylenically unsaturated carboxylic acids.

3. The process of claim 1, wherein the alkali metal bisulfite is sodium bisulfite.

4. The process of claim 1, wherein the aqueous composition further comprises one or more surfactants.

5. The process of claim 4, wherein the surfactant is selected from the group consisting of an aliphatic anionic surfactant, a synthetic polyisobutylene sulfonate, a sulfonate, an alcohol, a nonionic surfactant, or some combination thereof.

6. The process of claim 5, wherein the surfactant is selected from the group consisting of an alpha-olefin sulfonate, an olefin sulfonated, an alkyl-aryl sulfonated, an alkyl-ether sulfonate.

7. The process of claim 1, wherein the combining of the stable aqueous solution and the alkali metal bisulfite occurs outside the earthen formation.

8. The process of claim 1, wherein the combining of the stable aqueous solution and the alkali metal bisulfite occurs within the earthen formation.

9. The process of claim 1, wherein combining the oxygen-scavenger composition and the aqueous composition occurs outside the earthen formation.

10. The process of claim 1, wherein combining the oxygen-scavenger composition and the aqueous composition occurs within the earthen formation.

11. The process of claim 1, wherein the oil recovery solution has a pH ranging from 6 to about 8.

12. The process of claim 1, further comprising introducing the oil recovery solution into an earthen formation at a pressure to provide for enhanced oil recovery.

13. The process of claim 1, wherein the aqueous composition comprises seawater.

14. The process of claim 1, wherein the aqueous composition comprises fresh water.

15. The process of claim 1, wherein the process includes mixing a stream of the stable aqueous solution with a stream of the alkali metal bisulfite.

16. The process of claim 15, wherein the mixing occurs via an in-line mixer upstream of a tank.

17. The process of claim 1, wherein the oxygen-scavenger composition is added to a stream of water upstream of a tank.

18. The process of claim 1, wherein the oxygen-scavenger composition and water are mixed in a tank without using a mixer.

19. The process of claim 1, wherein the oil recovery solution provides an excess of about 50 ppm to about 100 ppm of sodium hydrosulfite equivalent after scavenging all the oxygen in the formation.

* * * * *